United States Patent
Healy (10) Patent No.: US 9,600,827 B2
(45) Date of Patent: Mar. 21, 2017

(54) 3D GLASSES WITH RFID AND METHODS AND DEVICES FOR IMPROVING MANAGEMENT AND DISTRIBUTION OF SOLD COMMODITIES

(75) Inventor: Andrew Healy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 596 days.

(21) Appl. No.: 14/009,521

(22) PCT Filed: Apr. 4, 2012

(86) PCT No.: PCT/US2012/032210
§ 371 (c)(1),
(2), (4) Date: Oct. 2, 2013

(87) PCT Pub. No.: WO2012/138787
PCT Pub. Date: Oct. 11, 2012

(65) Prior Publication Data
US 2014/0052486 A1    Feb. 20, 2014

Related U.S. Application Data

(60) Provisional application No. 61/471,599, filed on Apr. 4, 2011.

(51) Int. Cl.
*G06F 19/00* (2011.01)
*G06Q 30/02* (2012.01)
*G06Q 30/04* (2012.01)

(52) U.S. Cl.
CPC ......... *G06Q 30/0201* (2013.01); *G06Q 30/02* (2013.01); *G06Q 30/0207* (2013.01); *G06Q 30/0252* (2013.01); *G06Q 30/04* (2013.01)

(58) Field of Classification Search
CPC .......... G02B 2027/0178; G02B 27/017; G02B 27/0093; G02B 27/0172; G02B 27/0176;
(Continued)

(56) References Cited

U.S. PATENT DOCUMENTS

| | | | |
|---|---|---|---|
| 6,877,094 B1 * | 4/2005 | DiGiorgio | G06Q 20/04 713/176 |
| 7,946,477 B1 * | 5/2011 | Ramachandran | G06K 7/0004 235/379 |

(Continued)

FOREIGN PATENT DOCUMENTS

| | | |
|---|---|---|
| JP | 2005-149079 | 6/2005 |
| JP | 2005-215324 | 8/2005 |

(Continued)

OTHER PUBLICATIONS

RFID Technology—Eco3DGlasses.com "RFID-Based Inventory Tracking and Shrinkage Prevention Program" 2011.

*Primary Examiner* — Thien M Le (57) ABSTRACT

RFID data is utilized for billing and management of 3D glasses in a cinema theater or group of theaters. RFID pedestals identify privately owned or rented 3D glasses brought into a theater by a customer. An invoice is automatically generated billing the theater operator for the use of the 3D glasses. Usage of the glasses along with other data collected about the customers is utilized for targeted advertising (e.g., e-mails, texts, selected advertise in pre-show, etc.). The invention reduces up front cost in installing a reusable 3D glasses system.

29 Claims, 3 Drawing Sheets

(58) Field of Classification Search
CPC .... G02B 2027/0118; G02B 2027/0134; G02B 2027/014; G02B 2027/0187; G02B 27/22; G02B 27/2228; G02B 5/20; G02B 5/30
USPC .......................... 235/385, 380, 492, 486, 381
See application file for complete search history.

(56) References Cited

U.S. PATENT DOCUMENTS

| | | | |
|---|---|---|---|
| 2001/0019966 A1* | 9/2001 | Idaka | G07F 17/32 463/40 |
| 2004/0203636 A1 | 10/2004 | Chan | |
| 2005/0131792 A1 | 6/2005 | Rowe | |
| 2005/0248719 A1* | 11/2005 | Howell | G02C 11/10 351/41 |
| 2007/0143207 A1* | 6/2007 | Breen | G06Q 20/102 705/40 |
| 2008/0218684 A1 | 9/2008 | Howell | |
| 2008/0318477 A1* | 12/2008 | Standke | H01R 13/465 439/620.01 |
| 2011/0012896 A1* | 1/2011 | Ji | H04N 13/0429 345/419 |
| 2011/0122152 A1* | 5/2011 | Glynn | G06F 21/84 345/629 |
| 2011/0213664 A1* | 9/2011 | Osterhout | G02B 27/017 705/14.58 |
| 2013/0001306 A1 | 1/2013 | Healy | |

FOREIGN PATENT DOCUMENTS

| | | |
|---|---|---|
| WO | 02/21424 | 3/2002 |
| WO | 2007/086808 | 8/2007 |
| WO | 2009/121942 | 10/2009 |

* cited by examiner

3D GLASSES WITH RFID AND METHODS AND DEVICES FOR IMPROVING MANAGEMENT AND DISTRIBUTION OF SOLD COMMODITIES

CROSS-REFERENCE TO RELATED APPLICATIONS

This application claims priority to U.S. Provisional Application No. 61/471,599 filed 4 Apr. 2011, hereby incorporated by reference in its entirety.

BACKGROUND OF THE INVENTION

The present invention relates to the provision/distribution, collection, and management of commodities, particularly goods for sale such as 3D glasses, to a venue for use and return for washing/reconditioning, etc. The invention also relates to washing glasses utilized in theater operations and in particular 3D viewing glasses including spectral separation glasses, polarized glasses, and/or shutter glasses that are re-used by theater audiences after washing. The invention is yet further related to the use of RFID integrated into 3D glasses and utilized for, for example, management, analysis, and costing practices.

Theater operators showing specialized shows such as 3D cinema have provided audiences with viewing glasses for observation of special effects. In 3D cinema the 3D effect is generally caused by projecting left and right images onto a screen and utilizing glasses to "separate" the images such that the left eye only/mainly views left images and the right eye only/mainly views right images. Techniques for separation may include spectral separation (for example, each eye receives an RGB image, but left eye's RGB image is derived from different portions of the red, green, and blue spectrum compared to the right eye's RGB image). Other forms of separation include polarization (each eye receives an image of a specific polarization), and shutters for each eye that open and close when a corresponding left or right image is being displayed.

Some of the glasses are inexpensive to construct (e.g., made of cardboard/plastic frames and plastic/mylar lenses), and are known as disposable glasses. While the quality of the disposable glasses is sufficient to view 3D effects, they are generally not suitable for washing and/or re-use. In the best case, after use, disposable glasses are introduced into a re-cycling process, or they are discarded. Other premium viewing systems include glasses, and particularly lenses, constructed from harder materials that may be re-used in an environmentally friendly manner after washing. And, washing and re-use of glasses over time may be less expensive than distributing new disposable glasses after each viewing.

SUMMARY OF THE INVENTION

The present inventor has realized the need to reduce the cost of initial installation and for better pricing models, tracking, and information gathering related to the use and re-use of 3D glasses in cinema and other applications. In one embodiment, the present invention detects RFID data that identifies 3rd party owned (e.g., customer owned, exhibitor owned or rented glasses). The detected RFID data is then utilized for billing and management of 3D glasses in a cinema theater, group of theaters, or other venue(s). RFID pedestals or other detection devices may be used to identify the 3rd party/privately owned 3D glasses brought into a theater by a customer. An invoice may be automatically generated billing the theater operator for the use of the 3D glasses. Usage of the glasses along with other data collected about the customers is utilized for targeted advertising (e.g., e-mails, selected advertise in pre-show, etc.).

The present invention includes a method of detecting and/or managing RFID 3D glasses. A method according to the invention may comprise any one or more of the following steps: installing RFID detection equipment at the entrances of every screen for data collection, networking RFID pedestals (or detectors) to a cinema or other server and/or linking to a server for consolidated billing purposes, selling RFID enabled glasses to consumers, perhaps at cost, through the exhibitor or via the web (e.g., via a link on a ticket sellers web page—e.g., Fandango), collecting a minimum fee from the exhibitor every time the glasses are used at a screen, as detected by the RFID pedestals, recovering investment cost of the glasses (this cost may be aligned with royalty rates or other costs incurred with disposable single-use glasses) via upfront payments that may reduced by rebate through use, collecting usage data per user for a variety of commercial uses (for example, knowing the demographics of the audience allows the D-Cinema server present different pre-show content on-the-fly, or provide a proactive marketing campaign for upcoming movies or other events based on the known viewing pattern of 3D cinema goers (customers) as a result of data collection via RFID, providing the customer a discount each time they return to the cinema with their own 3D glasses, perhaps a $1 off the 3D movie ticket price, which would be lower than current single use disposable systems.

Portions of the system, method, and devices according to embodiments of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts/transmissions, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
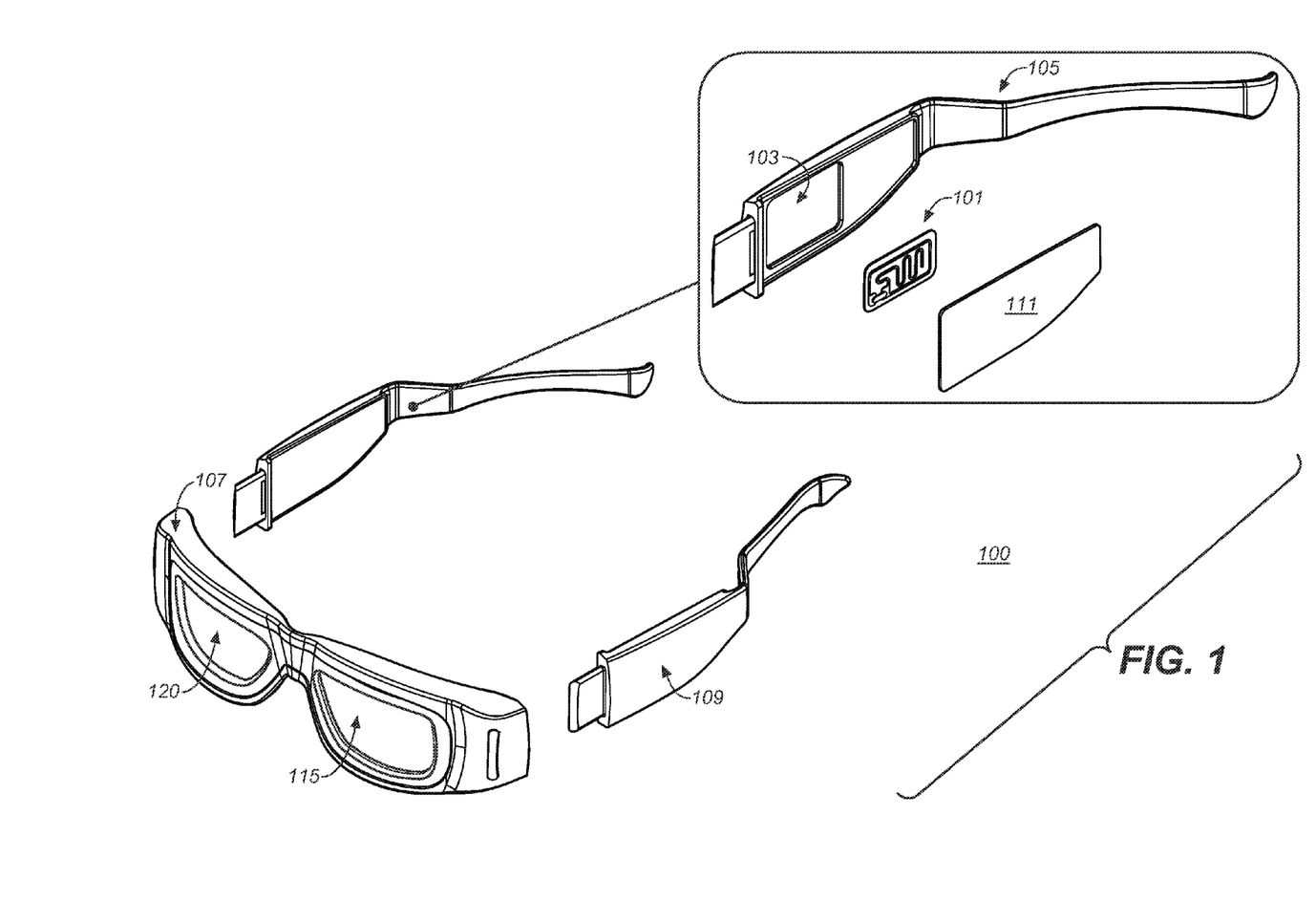
FIG. 1 is a drawing of a pair of 3D glasses with a Radio Frequency Identification (RFID) tag embedded according to an embodiment of the present invention.

Referring now to the drawings, wherein like reference numerals designate identical or corresponding parts, and more particularly to FIG. 1 thereof, there is illustrated a drawing of a pair of 3D glasses 100 with a Radio Frequency Identification (RFID) tag 101 embedded according to an embodiment of the present invention. The 3D glasses may be constructed such that the RFID tag 101 is maintained in a cut-out area 103 of a left temple 105 of the glasses. The tag may be secured to the cut-out area 103 (or, in other embodiments, other portions of the glasses, e.g., nose piece/frame 107, right temple 109, etc.) via adhesives or other attachment mechanisms. The RFID tag may be further secured via a cover (e.g., cover 111), and may include a ridge (or grooves) to engage either the RFID tag or matching portions of the cut-out area.

In other embodiments, the RFID tag is molded directly into or on a surface of the glasses. In yet other embodiments, the RFID is attached to the exterior of the frame of the glasses. In yet further embodiments, the RFID tag constitutes a portion of the frame of the glasses (e.g., rather than being, for example, molded into a temple of the glasses, the RFID tag is the temple, or a portion of the temple, of the glasses.

While RFID is specifically discussed, it should be understood that other electronic or wireless mechanisms may be substituted for the RFID tag(s) of the invention along with other related equipment (e.g., scanners) associated with the electronic and/or wireless devices so chosen. It is also assumed that the reader has a basic understanding of 3D glasses, such as 3D glasses 100, which are utilized by theaters and other venues, and that the lenses 115 (left) and 120 (right) are specific to the type of projections utilized (e.g., polarization based, spectral separation, etc.), and the advantages (environmentally and cost savings) that occur by re-use of the glasses.

Right temple 105 may also have embedded an anti-shoplifting device (e.g., a device based on acousto-magnetic technology). In one embodiment, the RFID tag and anti-shoplifting devices are combined and/or embedded in a same area of the glasses frame.

As explained in more detail below, the invention, and particularly the 3D glasses with embedded RFID tag embodiment, will establish or enable one or more methods for data collection used in various embodiments of the invention. For example, the invention allows for embodiments that include metric collection such as customer usage data, glasses quality, date of manufacture, as well as ticketing and re-collection of glasses from theater patrons.

The invention is advantageous in rental models of 3D glasses in that it allows accurate measurements of usage that could enable alternate revenue generating methods including, but not limited to, exhibitor per-glasses licensing, leasing, and distribution. An exemplary rental model is explained in Healy et al., International Patent Application No. PCT/US2011/028366, the contents of which are incorporated herein in their entirety for all purposes.

Data gathered from embedded RFID tags (RFID chips) may be used to forecast replenishment stock due to deterioration of the glasses with use and washing. Data gathered may also be used to highlight theaters with abnormally high failures for follow up corrective action, including increased charges. Quality Assurance procedures or methods may use the data to address field problems, issue corrective action and recover costs from suppliers, as appropriate.

The present invention specifically goes further and, in some embodiments, provides establishing a system where a glasses distributor or proprietor interacts with a theater/exhibitor or venue operator to provide services that allow 3D glasses to be utilized at the venue at a cost equivalent or less than single use disposable glasses. Variations on the form of the interaction and the specific details on how that interaction is performed is provided.

In one embodiment, in conjunction with a cinema theater or other venue operator customers, a glasses proprietor either sells 3D glasses at a minimal amount (TBD, e.g., at cost) or provides the glasses free-of-charge to theater/venue patrons (customers). The glasses have embedded RFID that have a unique identifier in the RFID S/N separating them from other theater owned 3D glasses and may have an additional visual differentiator, such as color to allow theater staff to readily distinguish the glasses.

Figure 2:
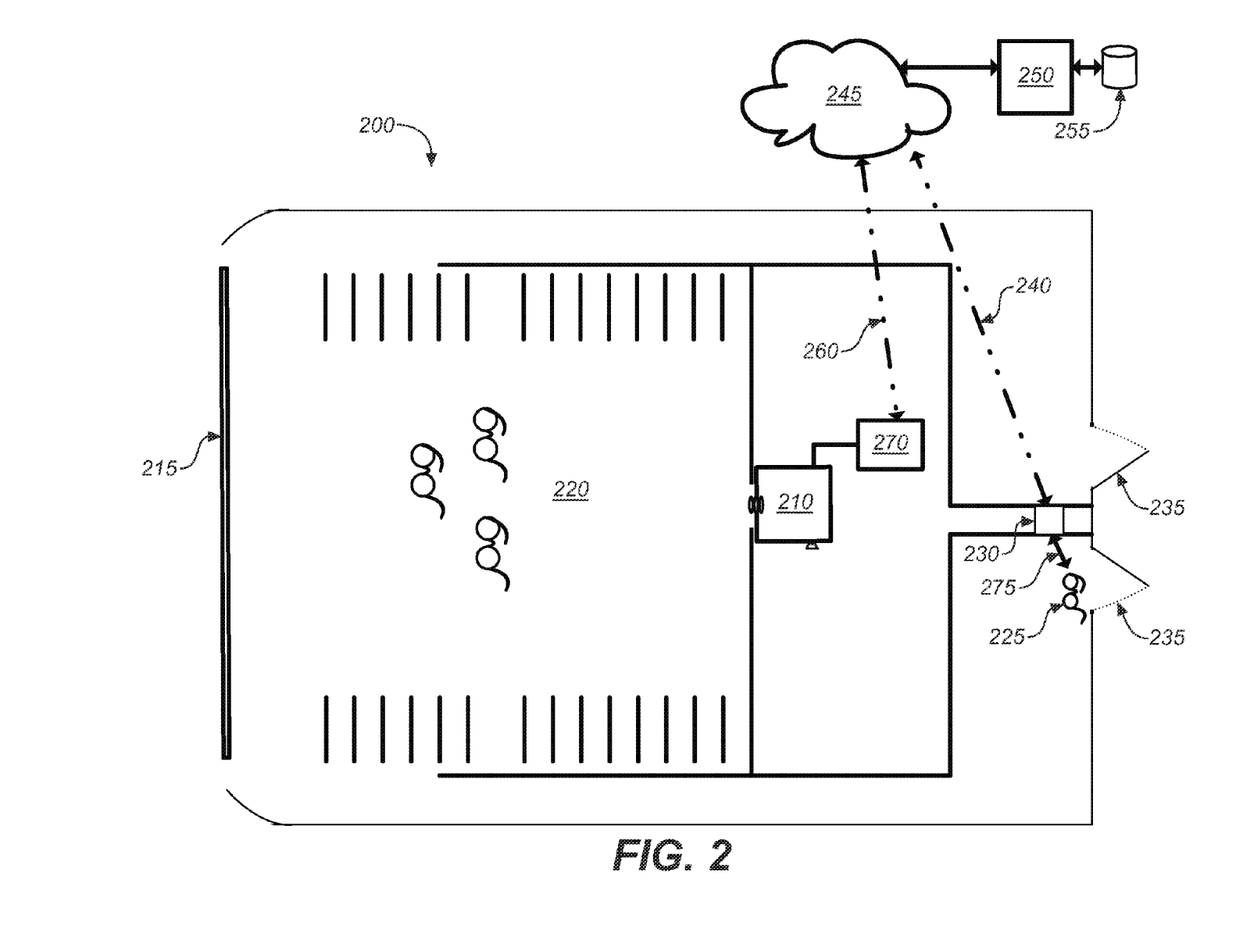
FIG. 2 is a drawing illustrating a cinema theater and data flow according to an embodiment of the present invention.

FIG. 2 is a drawing illustrating a cinema theater 200 and data flows according to an embodiment of the present invention. The theater 200 includes a display device (e.g., projector 210), a display screen 215 and a viewing area 220. Utilizing RFID pedestals installed in the theater (e.g. RFID pedestal 230), perhaps owned by a 3D glasses proprietor, distributor, or other stakeholder, 3D glasses entering the theater are detected. In one embodiment, RFID pedestals are located at multiple locations in the theater to provide redundancy and assure that each pair of RFID enabled glasses (e.g., RFID enabled 3D glasses 225) is identified. Additional pedestals throughout the theater can help maintain communications with the glasses at all times while the customers are present in the theater. As shown, RFID pedestal 230 located near entrance doors 235 will likely be sufficient for basic accounting of 3D glasses entering the theater. Communications 275 (upstream and downstream) are shown between the 3D glasses 225 and the RFID pedestal 230.

Communication 240 to the server contains, for example, RFID information regarding the detected glasses is then transmitted to tracking/management (t/m) server 250 and stored in database 255 (combined may be referred to as the distributor's cloud). The communications to tracking/management server 250 (upstream communications) may also be made via network or other connections from RFID pedestal 230 to cinema server 270. Communication 240 may also contain other information. Communication 240 may also be a downstream communication which may contain, for example, information to be written into a memory of the RFID chip.

In one embodiment, the downstream communications may include a communication that contains advertising. Advertising information contained in the communication, may, in some embodiments, be displayed on a screen connected to the RFID chip. In one embodiment, the screen is attached to the glasses (e.g., displays advertising on a temple of the glasses). In another embodiment, the screen is a display on a cell phone or other mobile device, the mobile device receiving data to display from the RFID chip via wireless connection. Other types of data including emails, text messages, news reports, twitter, Facebook updates, etc. may be channeled through the RFID pedestal (e.g., originating from the t/m or cinema servers) and to the glasses and/or on to a connected mobile device (or generated by the attached mobile device and sent out to the Internet via the pedestal).

In one embodiment, data stored by the system could be used to detect and locate users in the event of an emergency, such as earthquake. An accurate count of users could be reviewed from server records in a particular theater and user data such as names could be provided to authorities.

Tracking/management server 250 and database 255 may be located off-site and connected via Internet 245 to the theater. Connections to the RFID pedestal may be wired or wireless. The 3D glasses proprietor/distributor then charges the theater a minimum amount for the use of the glasses, for example $0.25 per use. The peruse charges are, for example, billed via automatically generated invoices (a surcharge may be added for user initiated communications). In one embodiment, tracking/management server 250 emails an automatically generated electronic invoice to the theater listing all occurrences of RFID enabled 3D glasses utilized for a particular show.

The present invention includes providing discounts to customers returning to the theater with their own 3D glasses, and the provision of discounts and/or special offers to customers with their own 3D glasses. Such discounts or special offers may be automatically generated and emailed (or text messaged) to registered owners via tracking/management server 250.

Customer information may be captured utilizing RFID S/N, and additional information such as viewing content (transmitted from theater or in conjunction with RFID communication 240). The stored information may be data-mined, and, may be provided to exhibitors or $3^{rd}$ parties based on a fee per use, subscription, etc. The data may be mined for a theater, complex or theater-chain, and/or via movie or show type (find all users who frequent science fiction, drama, sports, etc.).

In one embodiment, customer patterns, preferences, and/or any other known information is analyzed and utilized to generate on-the-fly alternative or pre-show content based on the customers actually in the theater. The analysis and content determination can be made by tacking/management server 250 and transmitted/downloaded to cinema server 270 for display on screen 215. In one embodiment, an advertising script may be modified just prior to downloading to better target an individual or group in the theater.

The present invention also provides for loyalty (or frequent viewer) programs that utilize data collected from the 3D glasses. The loyalty programs may be automated and may be cross-registered with other loyalty programs such as frequent flyer accounts. In one embodiment, a loyalty program automatically puts points in a customer's frequent flyer account when entering a theater.

The present invention includes any method implementing one or more features of the invention described herein. In one embodiment, a method according to the invention comprises the steps of installing RFID pedestals at the entrances of every screen for data collection, networking these to the cinema server and linking to a server for consolidated billing purposes, selling RFID enabled glasses to consumers, perhaps at cost, through the exhibitor or via the web (e.g., via a link on a ticket sellers web page—e.g., Fandango), collecting a minimum fee from the exhibitor every time the glasses are used at a screen, as detected by the RFID pedestals, to recover Dolby's investment (this exhibitor cost may be targeted at a royalty or other costs incurred with disposable single-use glasses), collecting usage data per user for a variety of commercial uses, such as a Google revenue model implemented for theater operations (for example, knowing the demographics of the audience allows the D-Cinema server present different pre-show content on-the-fly, or provide a proactive marketing campaign for upcoming movies or other events based on the known viewing pattern of 3D cinema goers (customers) as a result of data collection via RFID), providing the customer a discount each time they return to the cinema with their own 3D glasses, perhaps a $1 off the 3D movie ticket price, which would be lower than current single use disposable systems.

Figure 3:
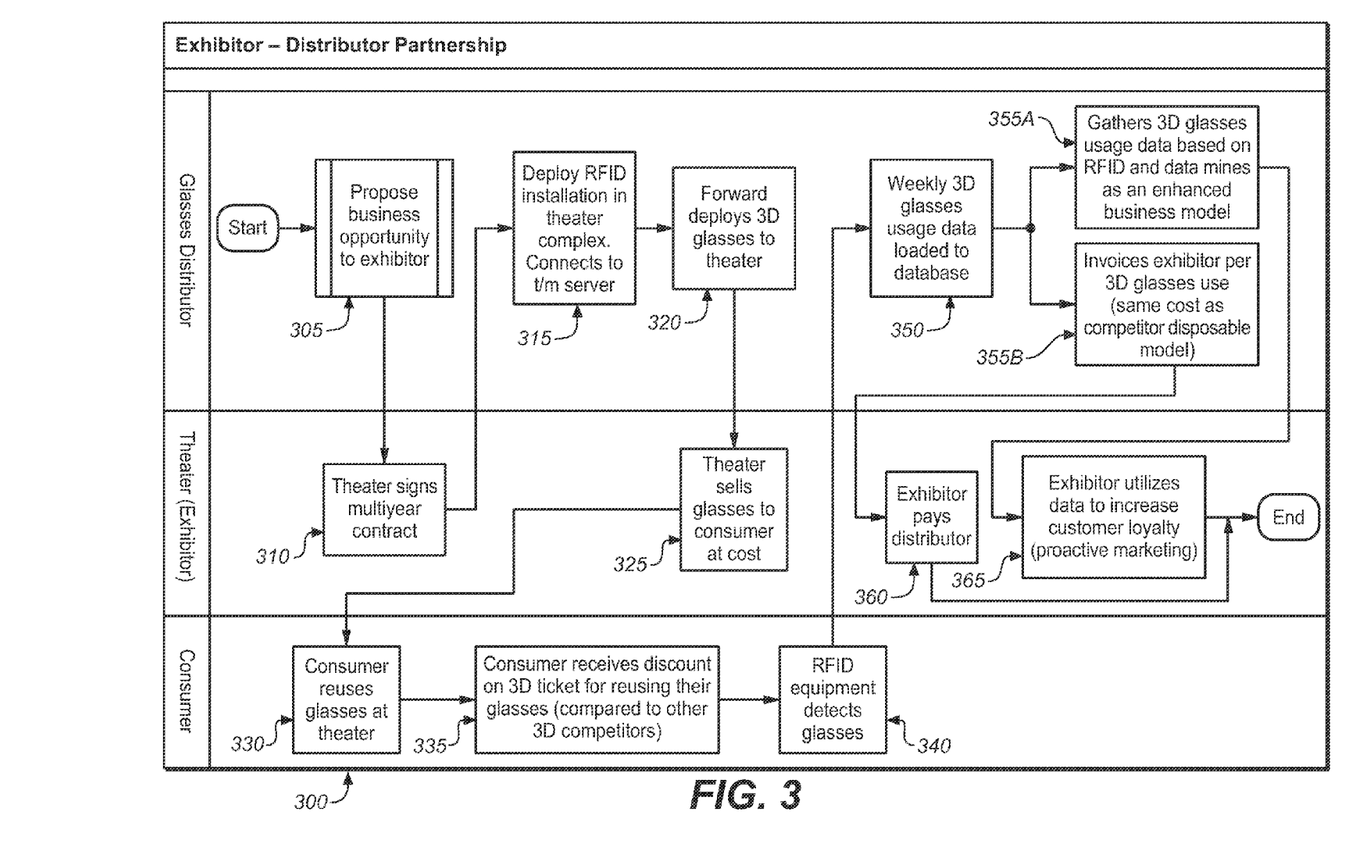
FIG. 3 is a process diagram illustrating interaction and partnership between an exhibitor and a 3D glasses distributor in a system according to an embodiment of the present invention.

FIG. 3 is a process diagram illustrating interaction and partnership 300, which may be implemented as a system or method, between an exhibitor and a 3D glasses distributor in a system according to an embodiment of the present invention. At step 305, a business relationship between the Exhibitor and 3D glasses distributor is initiated. The relationship is preferably contractual and over a period of years (step 310). An RFID installation is deployed at the theater (step 315) and may include a connection to the tracking/management server (e.g., t/m server 250). Such connection may be via a networked connection including wireless (e.g., satellite) or high speed internet connection.

3D glasses are provided for sale (forward deployment 320) at the theater. The forward deployed 3D glasses are sold to customer (theater patrons) (step 325) and utilized for viewing 3D cinematic presentations at the theater (e.g., step 330). The 3D glasses may be based on any of the current or future 3D technologies, including spectral separation, polarization based separation (including linear or circular polarization), shutter based separation, etc.

In one embodiment, the 3D glasses are sold to customers at cost, which has the advantage that the cost of the glasses is recovered after $1^{st}$ use. A similar profit profile can be realized whether the glasses are purchased and utilized once or on hundreds of occasions (e.g., step 330). In one embodiment, re-use of the 3D glasses optionally carries with it a ticket price discount (step 335) which is automatically implemented when the glasses are detected (step 340).

Data from detection of the 3D glasses is loaded (e.g., instantaneously, or on a periodic basis (e.g., weekly)) to a database (e.g., database 255 connected to t/m server 250). The data may then be used at step 355A, for example, to data mine and determine other action (e.g., provide real-time advertising or intelligent pre-show program). The data may also be utilized at step 355B to invoice the theater for use of the 3D glasses. Payment to the Glasses distributor is made (step 360), and the exhibitor implements a proactive marketing or loyalty program (step 365). In one embodiment, the intelligent placement of advertising during pre/post shows is sold to the highest bidders, or sold based on a marketing relevance (i.e., advertiser pays a higher fee if the demographics of the audience meet or exceed predetermined thresholds such as lifestyle, household income, or other factors that may be tracked or determined from data collected and/or stored in, for example, a database 255).

The present invention includes a business model that has benefits to all parties involved, including the theater, Dolby and the theater customers. As described, the system and methods of the invention provide a lower initial upfront investment (installation cost) in adopting 3D technologies with re-usable glasses (theater does not need to purchase, wash, or maintain glasses), lowering initial exhibitor cost (no need to buy glasses or washer), eliminates issues with 3D glasses damage or theft, eliminates the need to wash glasses, eliminates the need for additional 3D staff, eliminates both abuse and wear and tear from the public of what would otherwise be theater owned equipment, allows the use & benefits of rental models described in the above referenced patent applications, and other benefits. The present invention can be utilized to increase theater customer retention due to the reuse of glasses, discounts, loyalty programs, etc.

The present invention provides opportunities for data mining to better serve the customer base and meet advertising needs and increased advertising revenue. The present invention leverages instant messaging, Twitter, Facebook, etc. to, for example, proactively market upcoming cinema shows via email, messaging, USPS, etc.

The per-use fees allow the glasses distributor/proprietor to recover costs of the glasses fairly rapidly. In one embodiment, the customer pays full price (e.g., cost plus small markup) such that the proprietor and theater owner recover at least all costs to get the glasses into the customer's hands. The customer can then recoup a portion (or all) of the investment via a per use rebate (e.g., ½ the per use fee charged to the exhibitor) until recovered.

Use of the present invention also reduces theater overhead in managing glasses, including tracking, washing, handing & storage and recovering glasses from the customers. It also lowers the cost in other areas, such as power, staff, chemicals, water, maintenance of equipment and lower in-theater logistics. Minimal investment needed to enable this environment—existing cinema servers (e.g., cinema server 270) could be utilized to manage on-site 3D RFID data capture, process on-site billing info or report back to a central billing location for the generation of automatic invoices.

The present invention is a better environmental solution by reusing 3D glasses and reducing the need to wash glasses between shows. The present invention provides the opportunity to data-mine theater customers and reuse this data (e.g., sell back to the theaters, or sell to third parties).

The present invention may be beneficially combined with the 'rental' model presented in the above identified patent applications. The present invention has very little overhead for the exhibitor, apart from selling the glasses (which is provided at least for customer convenience).

Although the present invention has been described herein with reference to 3D glasses, a similar model may be implemented for other consumer products that are re-used.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner, and other devices having an equivalent function or capability, whether or not listed herein, may be substituted therewith. Furthermore, the inventor recognize that newly developed technologies not now known may also be substituted for the described parts and still not depart from the scope of the present invention. All other described items, including, but not limited to wireless devices, wireless detection, servers (e.g., cinema servers, databases, etc.), glasses, 3D separation techniques, accounting, billing, and management techniques, etc. should also be considered in light of any and all available equivalents.

In various embodiments, the present invention provides, for example, a system for 3D glasses, comprising a monitoring device configured to identify 3D glasses utilized a venue, and a controller configured to proactively in real time change at least one of content and scheduling at the venue based on 3D glasses identified. The controller may comprise data processing equipment, network and software for capturing, processing, analyzing, reporting and proactively in real time changing content and schedules at the venue. The controller may be, for example, the combination of t/m server 250, pedestal, wireless communications, and related connections/dataflow as described herein. The venue may comprise, for example, a theater complex.

The invention may also provide a system comprising 3D glasses containing RFID configured to have data written to and read from by other theater equipment. The data written to the 3D glasses comprises advertising.

The invention may also provide a system for 3D glasses distribution and use, comprising a venue, a monitoring device configured to identify 3D glasses utilized at the venue, and an automatic billing mechanism configured to bill an entity associated with the 3D glasses detected by the monitoring device. The monitoring device may be configured to identify 3D glasses using wireless data transmission from the glasses to the monitoring device and/or from the monitoring device to the glasses. The monitoring device may be configured to identify 3D glasses using RFID. The entity may comprise an owner or operator of the venue. The entity may comprise an owner of the 3D glasses and the billing comprises a credit. The entity may comprise a distributor of the 3D glasses. The bill may comprise a fixed amount per show where the 3D glasses are identified. The bill may be variable depending on the venue and what is showing at the venue when the glasses are identified.

The monitoring device may be further configured to forward identifications of 3D glasses to a data mining module. The system may further comprise a data mining module configured to access identifications made by the monitoring device. The system may further comprise an advertising module configured to select advertising based on a user associated (e.g., a user profile) with the identified 3D glasses. The advertising may be selected based on at least one of viewing habits derived from previous 3D glasses identifications, publically accessible database information about the user, Google searches targeting the user, and preferences provided by the user. The advertising may be sent to a cinema server and projected onto a movie screen as part of a pre-show program. The advertising may selected based on information about a plurality of users associated with the identified 3D glasses. Post-show advertising through email or other means may be selected based on a user associated with the identified 3D glasses.

A ticket booth servicing the venue may be utilized to provide a discount to a user for attending the venue when using identifiable 3D glasses. Alternatively, the discount may be provided by an on-line ticket seller. The discount may be provided as a refund back to the user after identifying the user's 3D glasses at the venue. The 3D glasses are registered to a credit card, pay-pal, or other payment mechanism and may be used to charge refreshments or souvenirs at the venue.

The present invention also provides for a pair of 3D glasses comprising a wireless identification mechanism configured to provide ID information to a billing system. The billing system may be configured to provide a rebate to a user of the 3D glasses when the 3D glasses are detected at a venue showing a 3D movie. The billing system may be configured to invoice an exhibitor (or another party) when the glasses are detected at a venue owned/operated by the exhibitor. The billing system may be configured to provide business intelligence to the exhibitor. The wireless identification mechanism may comprise RFID.

The present invention also provides for a 3D glasses detection and monitoring device configured to detect 3D glasses utilized at a venue and at least one of provide a discount to a user of the glasses, invoice a proprietor of the venue, credit a distributor of the glasses, and collect or distribute business intelligence related to use of the glasses. The device may be utilized to manage a partnership between a provider of 3D glasses and a venue where the 3D glasses are utilized. The partnership may comprise, for example, an agreement where the glasses are provided for use at the venue at a reduced cost (for free—or at no up-front cost) in exchange for a payment schedule for use of the glasses at the venue (e.g., actual accountable use as determined by presence of the glasses at an exhibitor's venue). The payment schedule may comprise, for example, a fixed fee or a variable schedule of payment amounts based on usage of the 3D glasses.

Data captured by the present invention may be communicated to a central database for automatic tracking and billing (aka Exhibitor cloud). Data stored by the system could be used to detect and locate users in the event of an emergency, such as earthquake. An accurate count of users could be reviewed from server records in a particular theater and user data such as names could be provided to authorities.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identifying 3rd party owned 3D glasses, billing related to the use of 3rd party owned glasses, directed advertising and on-the-fly content creation/modification, and the display, storage, or communication of results according to the processes of the present invention.

The present invention may suitably comprise, consist of, or consist essentially of, any of element, part, or feature of the invention and/or their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A system for 3D glasses, comprising:
a monitoring device configured to identify 3D glasses utilized at a venue; and
a controller configured to proactively in real time change at least one of content and scheduling at the venue based on 3D glasses identified; and wherein
the 3D glasses contain an RFID device configured to have data written to and read from the RFID device by a device in communication with theater equipment operable to produce the content including an audiovisual presentation.

2. The system according to claim 1, wherein the venue comprises a theater complex.

3. The system according to claim 2, wherein the monitoring device is disposed within an individual theater of the theater complex.

4. The system according to claim 1, wherein the controller comprises data processing equipment, network and software for capturing, processing, analyzing, reporting and proactively in real time changing content and schedules at the venue.

5. The system according to claim 1, wherein the data written to the RFID device comprises advertising.

6. The system according to claim 1, further comprising:
a database configured to communicate with the controller and including records associating each of the identified 3D glasses with a particular individual and with other information related to the particular individual; and
wherein the monitoring device includes a detector operative to detect 3D glasses in the vicinity of the detector and to obtain identifying information from the detected 3D glasses.

7. The system according to claim 6, wherein the controller changes at least one of content and scheduling at the venue based, at least in part, on the other information related to the particular individual.

8. The system according to claim 7, wherein the other information related to the particular individual includes at least one of viewing habits derived from previous identifications of the 3D glasses, publicly accessible database information related to the particular individual, information from Internet searches targeting the particular individual, or preferences provided by the particular individual.

9. A system for 3D glasses distribution and use, comprising:
a venue;
a monitoring device configured to identify 3D glasses utilized at the venue, the monitoring device including a detector configured to detect 3D glasses in the vicinity of the detector and to obtain identifying information from the detected 3D glasses;
an automatic billing mechanism configured to bill an entity associated with the 3D glasses detected by the monitoring device;
a controller configured to proactively in real time change at least one of content and scheduling at the venue based on 3D glasses identified;
a database configured to communicate with the controller and including records associating each of the identified 3D glasses with a particular individual and with other information related to the particular individual; and wherein the controller changes at least one of content and scheduling at the venue based, at least in part, on the other information related to the particular individual; and the other information related to the particular individual includes at least one of viewing habits derived from previous identifications of the 3D glasses, publicly accessible database information related to the particular individual, information from Internet searches targeting the particular individual, or preferences provided by the particular individual.

10. The system according to claim 9, wherein the monitoring device is configured to identify 3D glasses using wireless data transmission from the glasses to the monitoring device and/or from the monitoring device to the glasses.

11. The system according to claim 9, wherein the monitoring device is configured to identify 3D glasses using RFID.

12. The system according to claim 9, wherein the entity comprises an owner or operator of the venue.

13. The system according to claim 9, wherein the entity comprises an owner of the 3D glasses and the billing comprises a credit.

14. The system according to claim 9, wherein the entity comprises a distributor of the 3D glasses.

15. The system according to claim 9, wherein the bill comprises a fixed amount per show where the 3D glasses are identified.

16. The system according to claim 9, wherein the bill is variable depending on the venue and what is showing at the venue when the glasses are identified.

17. The system according to claim 9, wherein the monitoring device is further configured to forward identifications of 3D glasses to a data mining module.

18. The system according to claim 9, further comprising a data mining module configured to access identifications made by the monitoring device.

19. The system according to claim 9, further comprising an advertising module configured to select advertising based on the particular individual associated with the identified 3D glasses.

20. The system according to claim 19, wherein the advertising is selected based on at least one of the viewing habits derived from previous identifications of the 3D glasses, the publically accessible database information related to the particular individual, the information from Internet searches targeting the particular individual, and the preferences provided by the particular individual.

21. The system according to claim 20, wherein the advertising is selected based on information about a plurality of particular individuals associated with the identified 3D glasses.

22. The system according to claim 20, wherein post show advertising through email or other means is selected based on the particular individual associated with the identified 3D glasses.

23. The system according to claim 9, wherein a ticket booth servicing the venue provides the particular individual a discount for attending the venue when using identifiable 3D glasses.

24. The system according to claim 9, wherein:
the venue includes a theater that presents 3D movies;
the detector of the monitoring device is operative to detect 3D glasses in the theater where the 3D movies are presented and to obtain the identifying information from the detected 3D glasses; and
the automatic billing mechanism is coupled to receive the identifying information from the monitoring device.

25. The system according to claim 9, wherein:
the venue is a theater that presents audio visual content including 3D movies;
the records of the database further associate each of the identified 3D glasses with the entity to be billed;
the controller is coupled to receive the identifying information from the monitoring device and configured to change at least one of the content and scheduling at the theater based on the identifying information; and
the automatic billing mechanism is further configured to receive the identifying, information and to access the database to associate the identifying information with the entity to be billed.

26. A system for 3D glasses, comprising:
a monitoring device configured to identify 3D glasses utilized at a venue;
a controller configured to proactively in real time change at least one of content and scheduling at the venue based on 3D glasses identified;
a database configured to communicate with the controller and including records associating each of the identified 3D glasses with a particular individual and with other information related to the particular individual; and wherein
the monitoring device includes a detector operative to detect 3D glasses in the vicinity of the detector and to obtain identifying information from the detected 3D glasses;
the controller changes at least one of content and scheduling at the venue based, at least in part, on the other information related to the particular individual; and
the other information related to the particular individual includes viewing habits derived from previous identifications of the 3D glasses.

27. A system for 3D glasses, comprising:
a monitoring device configured to identify 3D glasses utilized at a venue;
a controller configured to proactively in real time change at least one of content and scheduling at the venue based on 3D glasses identified;
a database configured to communicate with the controller and including records associating each of the identified 3D glasses with a particular individual and with other information related to the particular individual; and wherein
the monitoring device includes a detector operative to detect 3D glasses in the vicinity of the detector and to obtain identifying information from the detected 3D glasses;
the controller changes at least one of content and scheduling at the venue based, at least in part, on the other information related to the particular individual; and
the other information related to the particular individual includes publicly accessible database information related to the particular individual.

28. A system for 3D glasses, comprising:
a monitoring device configured to identify 3D glasses utilized at a venue;
a controller configured to proactively in real time change at least one of content and scheduling at the venue based on 3D glasses identified;

a database configured to communicate with the controller and including records associating each of the identified 3D glasses with a particular individual and with other information related to the particular individual; and wherein the monitoring device includes a detector operative to detect 3D glasses in the vicinity of the detector and to obtain identifying information from the detected 3D glasses;

the controller changes at least one of content and scheduling at the venue based, at least in part, on the other information related to the particular individual; and the other information related to the particular individual includes information from Internet searches targeting the particular individual.

29. A system for 3D glasses, comprising:

a monitoring device configured to identify 3D glasses utilized at a venue;

a controller configured to proactively in real time change at least one of content and scheduling at the venue based on 3D glasses identified;

a database configured to communicate with the controller and including records associating each of the identified 3D glasses with a particular individual and with other information related to the particular individual; and wherein the monitoring device includes a detector operative to detect 3D glasses in the vicinity of the detector and to obtain identifying information from the detected 3D glasses;

the controller changes at least one of content and scheduling at the venue based, at least in part, on the other information related to the particular individual; and the other information related to the particular individual includes preferences provided by the particular individual.

* * * * *